United States Patent
Davis (10) Patent No.: US 8,033,371 B2
(45) Date of Patent: Oct. 11, 2011

(54) SINGLE COMPONENT ONE-WAY CLUTCH

(75) Inventor: Michael Davis, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 943 days.

(21) Appl. No.: 12/001,179

(22) Filed: Dec. 10, 2007

(65) Prior Publication Data

US 2008/0149447 A1 Jun. 26, 2008

Related U.S. Application Data

(60) Provisional application No. 60/876,499, filed on Dec. 21, 2006.

(51) Int. Cl.
*F16D 41/069* (2006.01)
*F16H 41/24* (2006.01)

(52) U.S. Cl. ..... 192/45.1; 60/345; 192/41 R; 192/107 T (58) Field of Classification Search ............ 60/345, 60/333, 341; 192/3.34, 45.2
See application file for complete search history.

(56) References Cited

U.S. PATENT DOCUMENTS

| | | | | |
|---|---|---|---|---|
| 2,689,633 A | * | 9/1954 | Turner | 192/41 A |
| 2,707,038 A | * | 4/1955 | Szady | 192/41 A |
| 3,572,034 A | * | 3/1971 | Fisher | 60/341 |
| 3,946,843 A | * | 3/1976 | Downs | 192/45.1 |
| 6,953,112 B2 | | 10/2005 | Miura | |
| 7,040,469 B2 | | 5/2006 | Shirataki et al. | |
| 7,850,420 B2 | * | 12/2010 | Brees et al. | 60/345 |
| 2003/0226732 A1 | * | 12/2003 | Kamiya et al. | 192/45.1 |

FOREIGN PATENT DOCUMENTS

JP 5-126168 A * 5/1993
JP 2002-70892 A * 3/2002

OTHER PUBLICATIONS

Machine translation of JP 2002-70892 A, Nov. 8, 2010.*
Machine translation of JP 5-126168 A, Nov. 5, 2010.*

* cited by examiner

*Primary Examiner* — Rodney Bonck
(74) *Attorney, Agent, or Firm* — Simpson & Simpson, PLLC (57) ABSTRACT

A one-way clutch including a race disposed about an axis for the clutch and a wedge plate with a plurality of finger elements extending toward the race and in contact with the race. One of the plate or race is arranged for rotational connection to a torque transmitting element in an automotive device and is arranged to rotate independently of the other of the plate or race for rotation, with respect to the other of the plate or race, in a first rotational direction. The plurality of fingers are arranged to grip the race, to rotationally lock the plate and race, for relative rotation of the plate or race in a second rotational direction, opposite the first rotational direction.

13 Claims, 10 Drawing Sheets

SINGLE COMPONENT ONE-WAY CLUTCH

CROSS-REFERENCE TO RELATED APPLICATIONS

This application claims the benefit under 35 U.S.C. §119 (e) of U.S. Provisional Application No. 60/876,499 filed on Dec. 21, 2006 which application is incorporated herein by reference.

FIELD OF THE INVENTION

The invention relates to improvements in apparatus for transmitting force. The force can be between a rotary driving unit (such as the engine of a motor vehicle) and a rotary driven unit (such as the variable-speed transmission in the motor vehicle), or the force can be transmitted within a rotary driving unit (such as the transmission of a motor vehicle). In particular, the invention relates to a one-way clutch with wedges having a circumferential dimension greater than an axial dimension and to a radial one-way clutch with axial spacing.

BACKGROUND OF THE INVENTION

Figure 1:
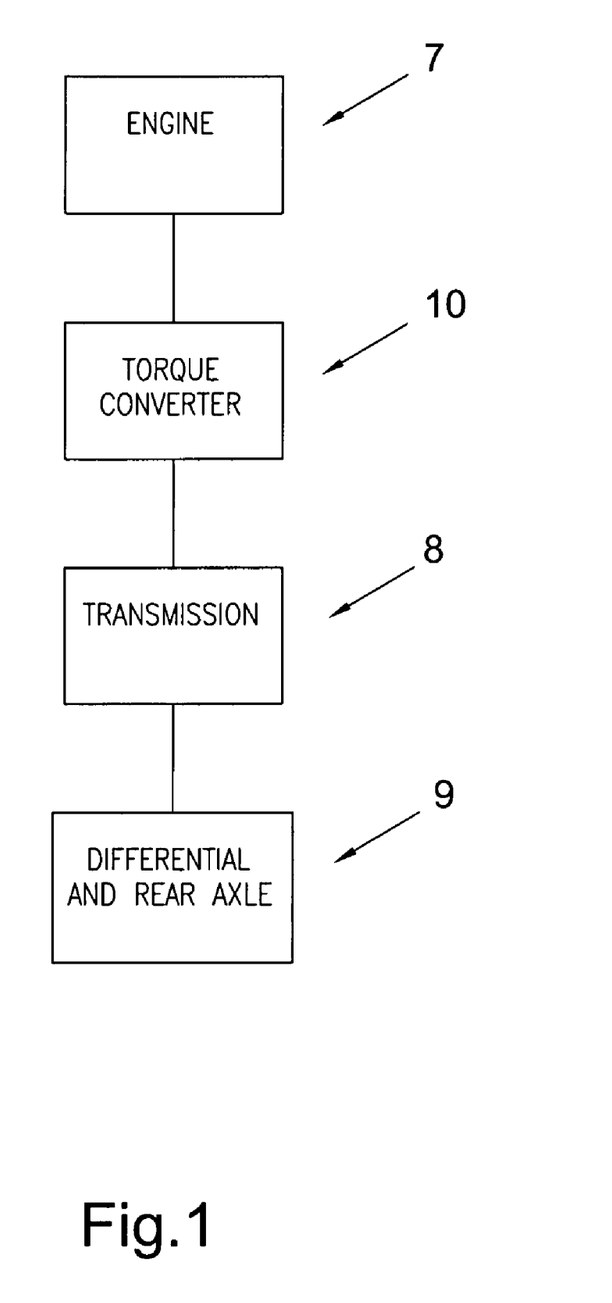
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
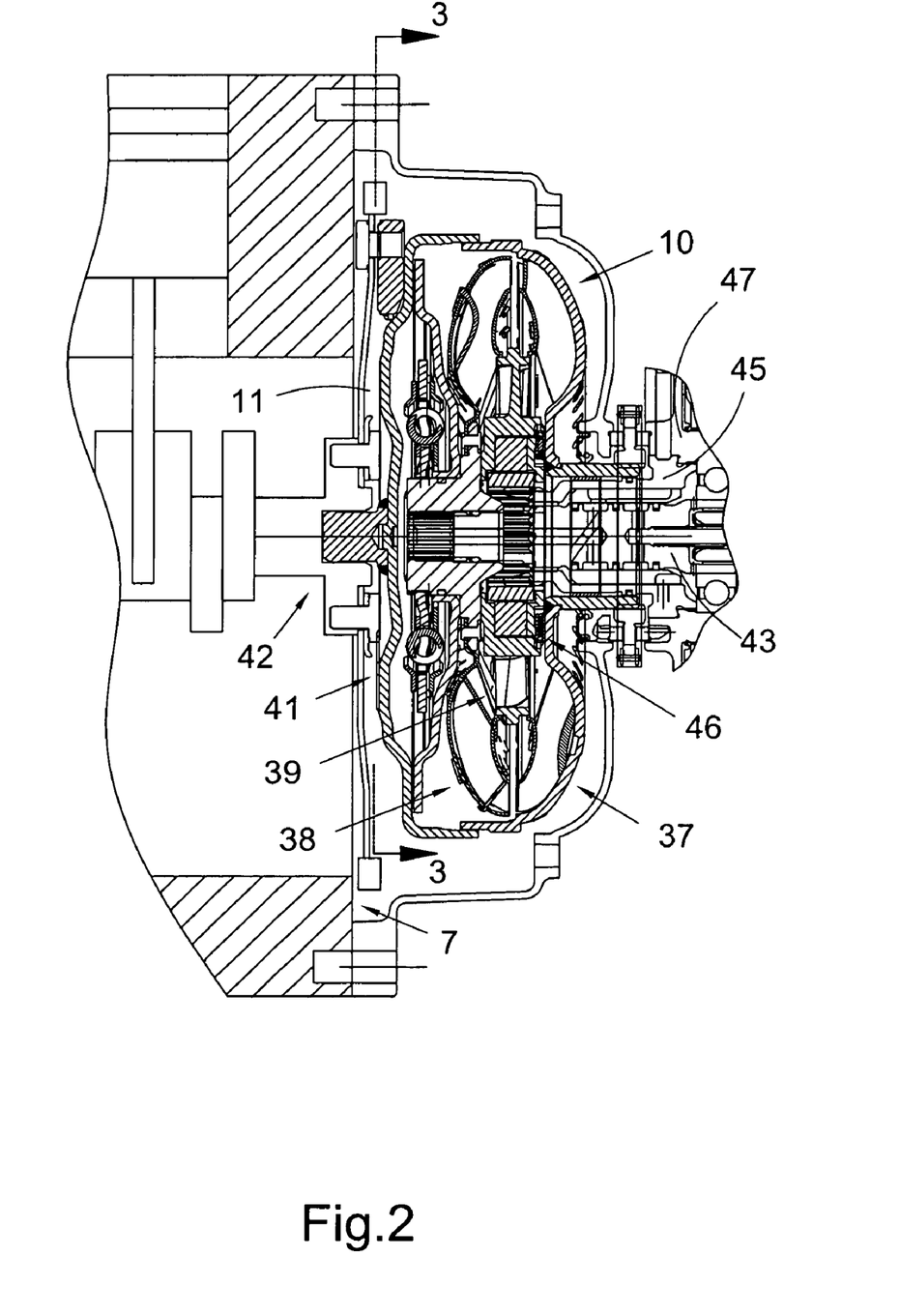
FIG. 2 is a cross-sectional view of a prior art torque converter, shown secured to an engine of a motor vehicle.
Figure 3:
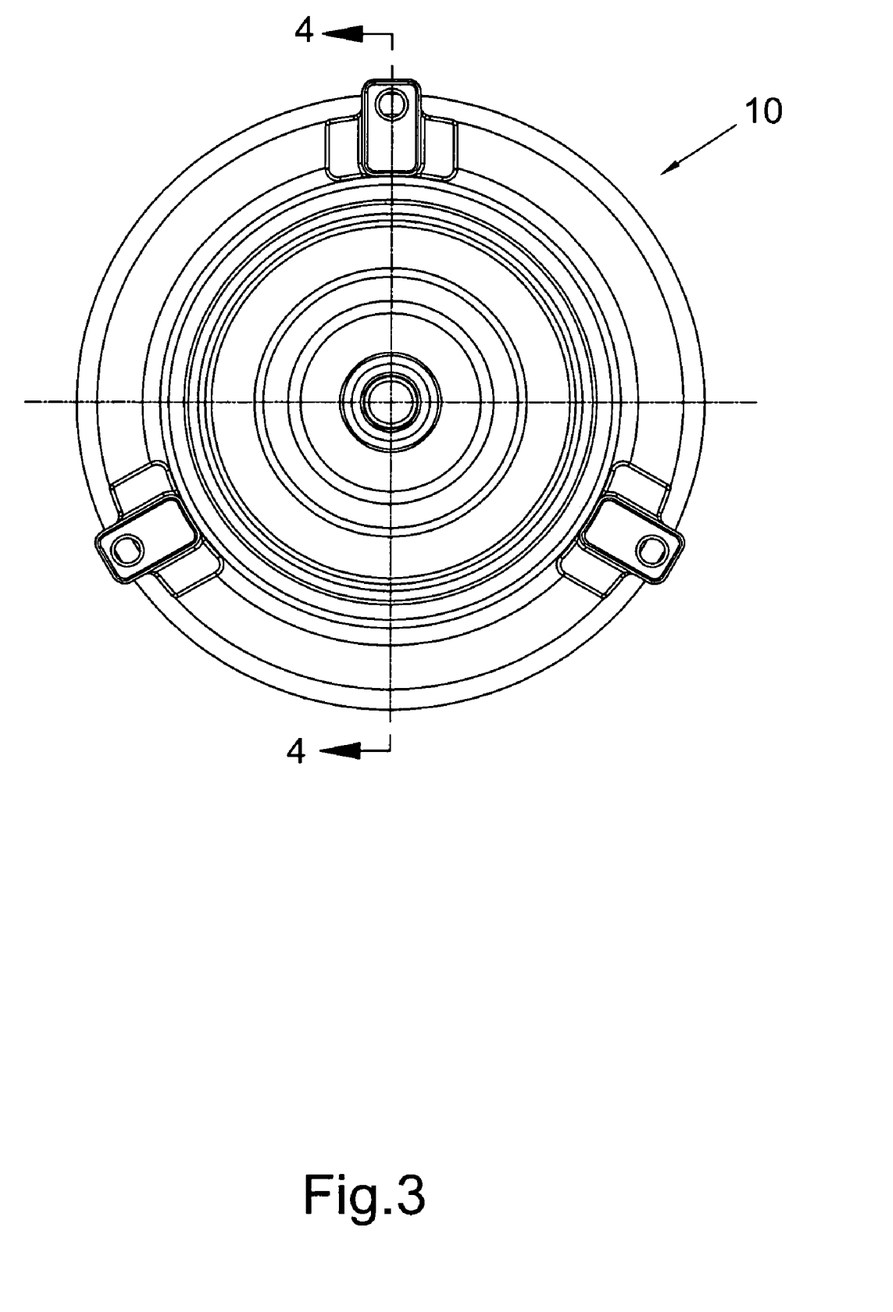
FIG. 3 is a left view of the torque converter shown in FIG. 2, taken generally along line 3-3 in FIG. 2.
Figure 4:
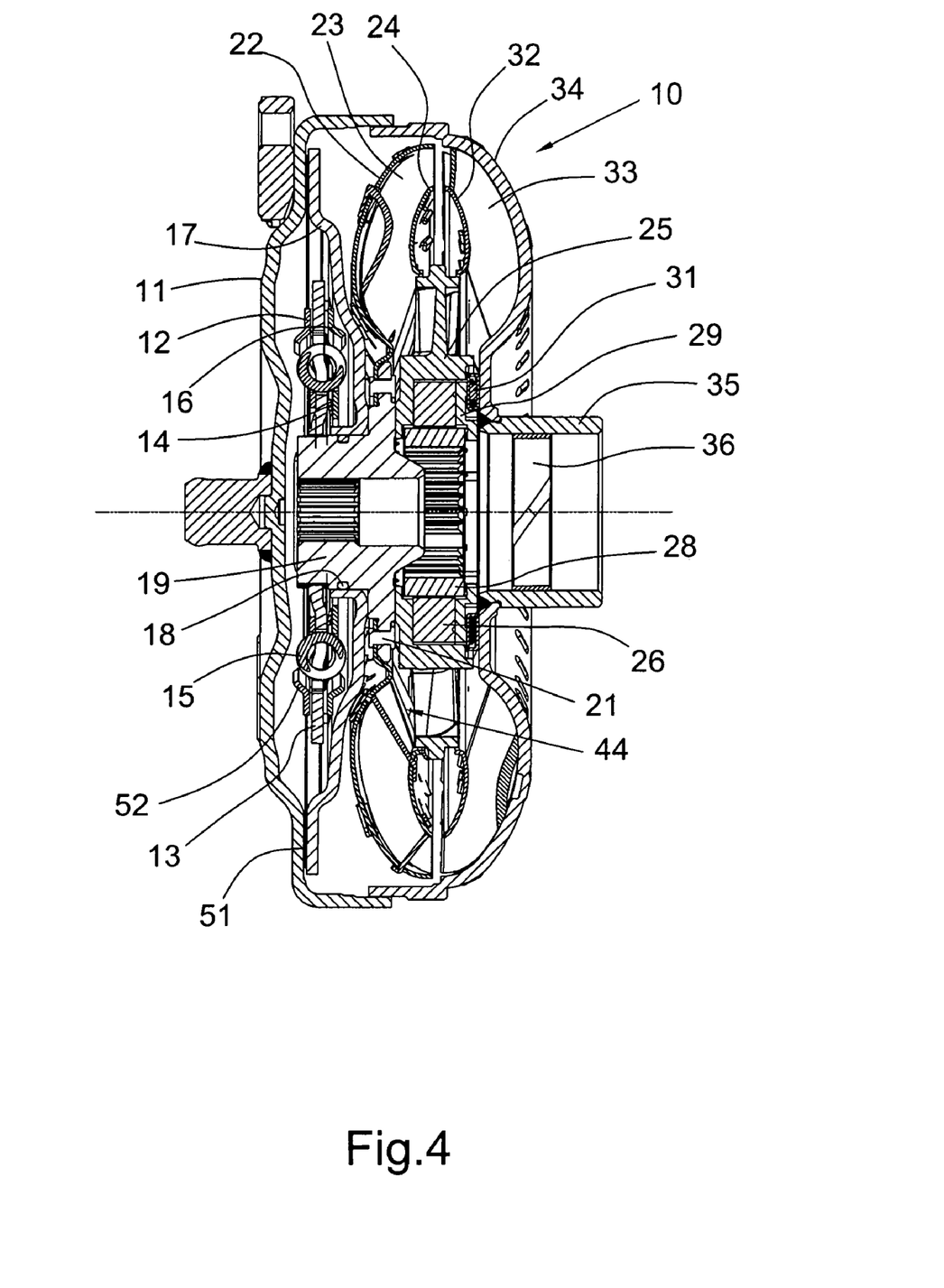
FIG. 4 is a cross-sectional view of the torque converter shown in FIGS. 2 and 3, taken generally along line 4-4 in FIG. 3.
Figure 5:
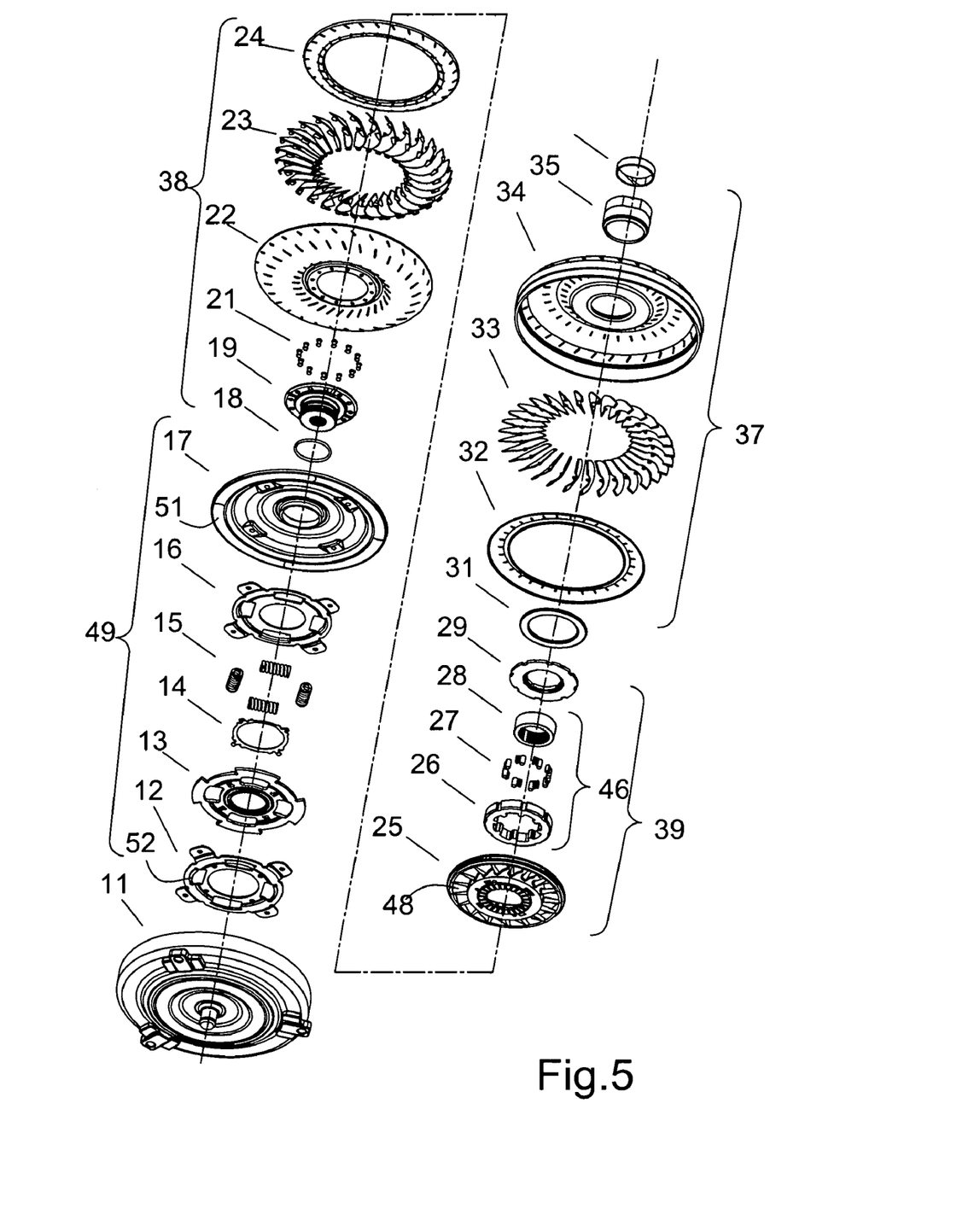
FIG. 5 is a first exploded view of the torque converter shown in FIG. 2, as shown from the perspective of one viewing the exploded torque converter from the left.
Figure 6:
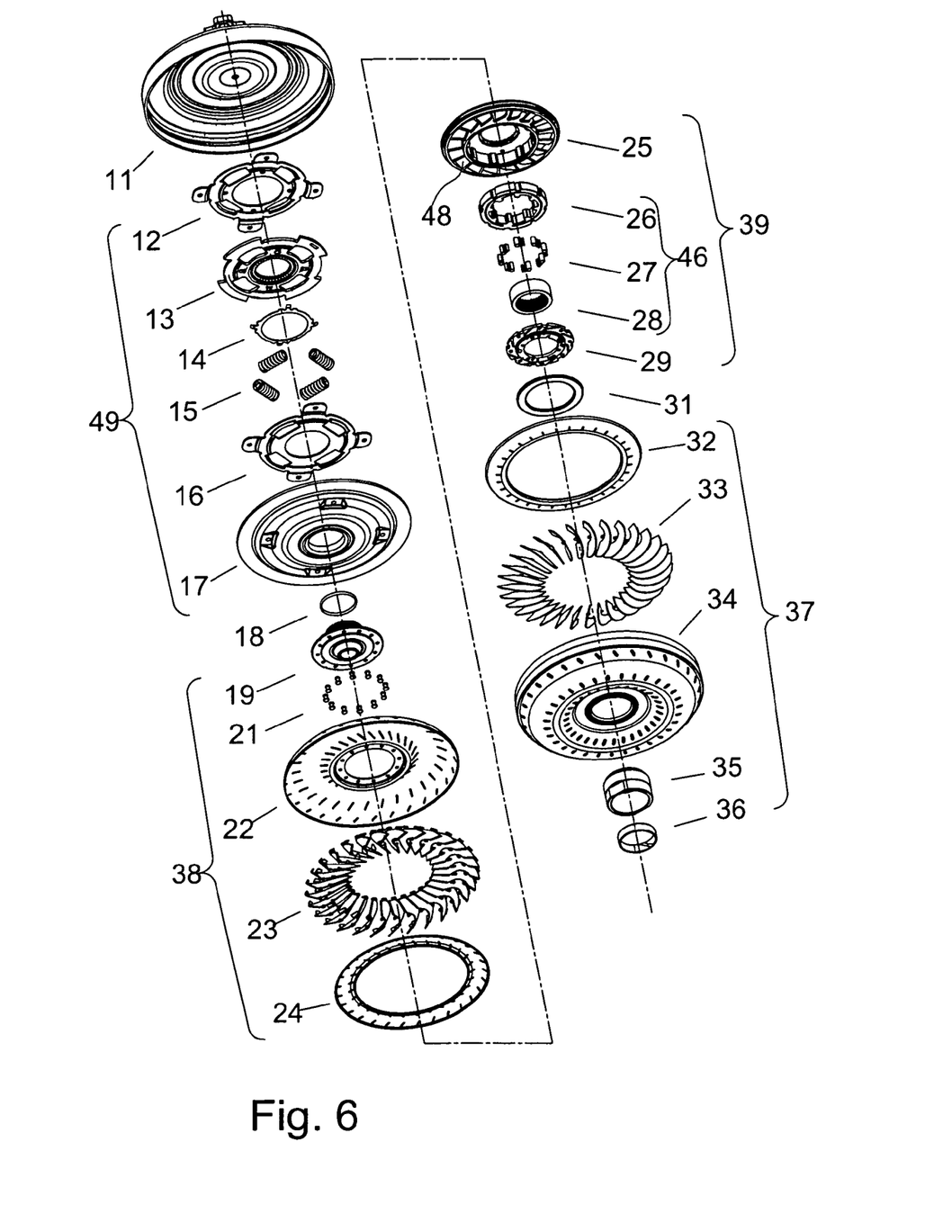
FIG. 6 is a second exploded view of the torque converter shown in FIG. 2, as shown from the perspective of one viewing the exploded torque converter from the right.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis.

Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

The use of roller clutches, such as clutch 46, also results in high stress due to the limited contact between the rollers in the clutch and the components radially bracketing the rollers. Therefore, the axial length of a roller clutch must be increased, undesirably increasing the axial space required for a component housing a roller clutch, for example, stator 39. U.S. Pat. No. 7,040,469 (Shirataki et al.) attempts to address stresses on retainers for roller clutches, but does not address the problem of reducing the axial length of the rollers. Sprag one-way clutches also suffer a similar undesirable increase in axial length for similar reasons. U.S. Pat. No. 6,953,112 (Miura) addresses problems associated with asymmetry of a frame for a sprag clutch, but does not address the problem of reducing the axial length of the clutch. Thus, roller and sprag one-way clutches increases the cost, weight, and complexity of stator 39, and subsequently, of torque converter 10. It should be understood that the preceding discussion regarding one-way clutches is applicable to applications other than a torque converter.

Some radial one-way clutches use one or more radially disposed plates. Unfortunately, thrust loads associated with a device housing the one-way clutch can cause axial compression of the plates, impairing the function of the clutch. It is known to increase the size and strength of end plates to withstand the loads, but this approach undesirably increases the width, weight, and cost of the clutch.

Thus, there is a long-felt need for a one-way clutch providing a better distribution of stress forces, having a reduced axial length, and having a means of preventing axial compression.

BRIEF SUMMARY OF THE INVENTION

The present invention broadly comprises a one-way clutch including a race disposed about an axis for the clutch, and a wedge plate with a plurality of finger elements extending toward the race and in contact with the race. One of the wedge plate or race is arranged for rotational connection to a torque transmitting element in an automotive device and is arranged to rotate independently of the other of the wedge plate or race for rotation, with respect to the other of the wedge plate or race, in a first rotational direction. The plurality of fingers are arranged to grip the race, to rotationally lock the wedge plate and race, for rotation of the one of the wedge plate or race, with respect to the other of the wedge plate or race, in a second rotational direction, opposite the first rotational direction.

The race includes a circumferential surface radially opposite the wedge plate, and for rotation of the one of wedge plate or race in the first direction the plurality of fingers are arranged to slide across the circumferential surface. For rotation of the wedge plate or race in the second direction the plurality of fingers are arranged to exert a radial force against the circumferential surface to oppose rotation of the wedge plate or race. The plurality of fingers is preloaded in the second direction.

The race includes a circumferential surface radially opposite the wedge plate and each finger in the plurality of fingers includes a circumferential surface shaped to conform to the circumferential surface of the race. In some aspects, the circumferential surface for the race includes a cylindrical surface with a first radius with respect to the axis and the circumferential surface for each finger includes a section of a cylindrical surface with a second radius, with respect to the axis, substantially equal to the first radius. In some aspects, the one-way clutch includes a spacing element disposed axially through the wedge plate and providing a mechanical path axially from one axial end of the clutch to the other axial end of the clutch.

The present invention also broadly comprises a one-way clutch including a race disposed about an axis for the clutch and a wedge plate with a plurality of finger elements. The race includes a circumferential surface radially opposite the wedge plate, the finger elements extend radially toward the race, the wedge plate or race is arranged for rotational connection to a torque transmitting element in an automotive device, and each finger element includes a distal end with a circumferential edge complimentarily shaped with respect to the circumferential surface.

In some aspects, the distal edge is at a nonuniform radial distance from a longitudinal axis for the wedge plate when the wedge plate is disengaged from the race. The circumferential extent of at least one finger in the plurality of fingers in contact with the race is greater than an axial extent of the at least one finger in contact with the race. The wedge plate or race is arranged to rotate independently of the other of the wedge plate or race for rotation, with respect to the other of the wedge plate or race, in a first rotational direction, the plurality of fingers are arranged to grip the race, to rotationally lock the plate and race, for rotation of the wedge plate or race in a second relative rotational direction, opposite the first rotational direction.

In some aspects, the circumferential surface includes a cylindrical surface with a first radius with respect to the axis and the circumferential edge includes a section of a circle with a second radius, with respect to the axis, substantially equal to the first radius. In some aspects, the one-way clutch includes a spacing element disposed axially through the wedge plate and providing a mechanical axial path from one axial end of the clutch to the other axial end of the clutch.

The present invention further broadly comprises a one-way clutch for a stator in a torque converter, including a hub arranged for rotational connection to a stator shaft for the stator, and a wedge plate including a plurality of finger elements extending radially inward toward the hub. The wedge plate is arranged for rotational connection to a blade assembly for the stator, each the finger element includes a distal end with a circumferential edge complimentarily shaped with respect to a circumferential surface for the hub, and the circumferential edge conformably engages the race circumferential surface.

The present invention broadly comprises a one-way clutch including a race disposed about an axis for the clutch; a clutch element radially disposed about the axis; and a spacing element disposed axially through the clutch element. The plate or race is arranged for rotational connection to a torque transmitting element in an automotive device and is arranged to rotate independently of the other of the plate or race for rotation, with respect to the other of the plate or race, in a first rotational direction. The plate is arranged to radially engage the race, to rotationally lock the plate and race, for rotation of the plate or race, with respect to the other of the plate or race, in a second rotational direction, opposite the first rotational direction. A circumferential extent of the plate in contact with the race is greater than an axial extent of the plate in contact with the race, and the spacing element provides a mechanical path axially between first and second axial ends for the clutch.

In some aspects, the spacing element is arranged to transmit a thrust load between the axial ends. In some aspects, the spacing element includes a plate radially disposed about the axis and having at least one axially displaced finger, the at least one axially displaced finger including at least a portion of the mechanical path. In some aspects, the race includes a circumferential surface radially opposite the clutch element, the clutch element includes a plurality of finger elements extending toward the race, each finger element includes a distal end with a circumferential edge complimentarily shaped with respect to the circumferential surface, and the circumferential edge conformably engages the race circumferential surface.

It is a general object of the present invention to provide a one-way clutch having a reduced axial width.

It is another general object of the present invention to provide a one-way clutch having a means of preventing axial compression.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
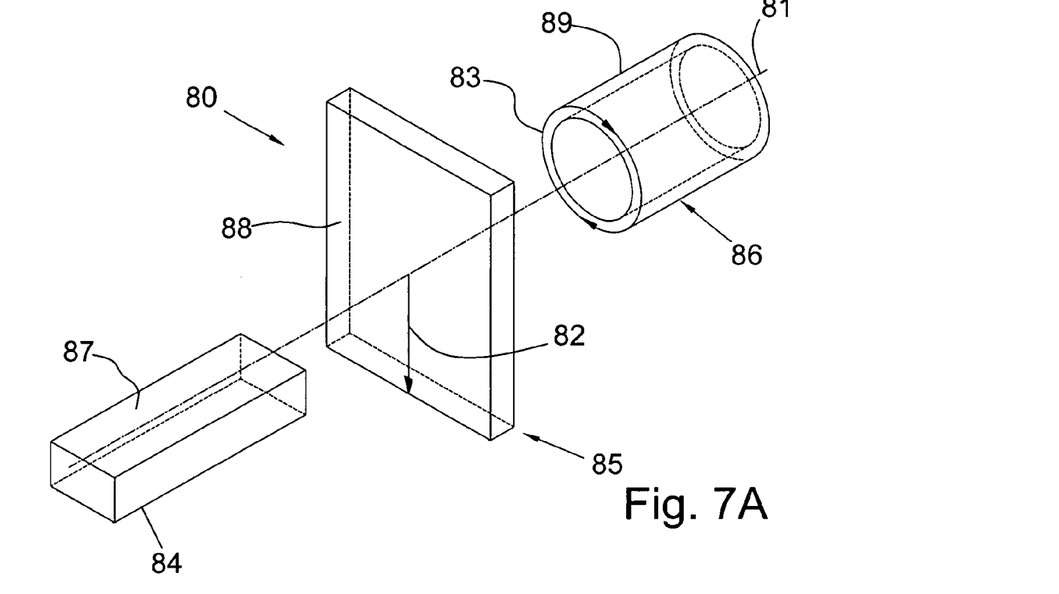
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
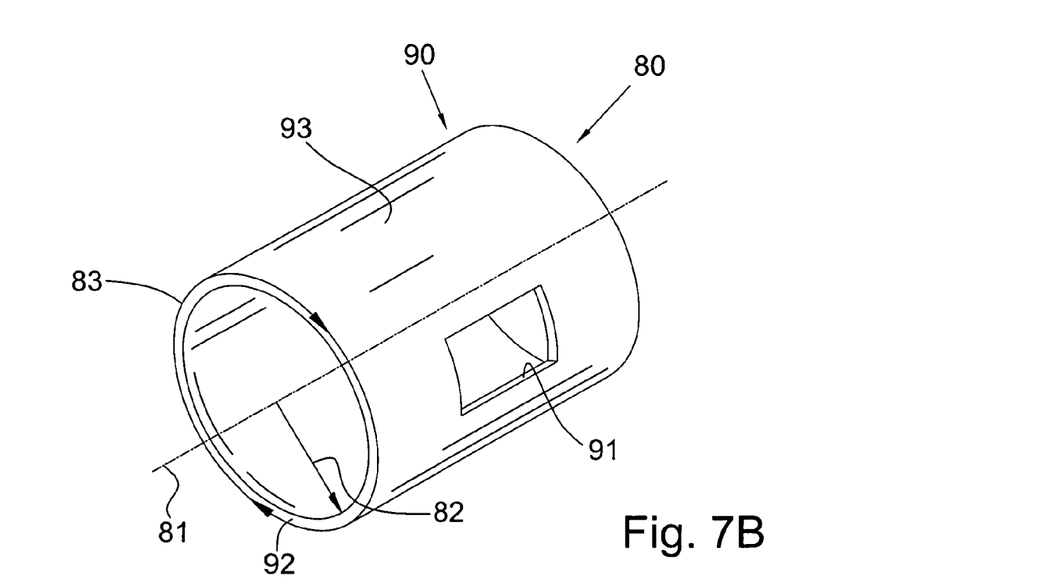
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 8:
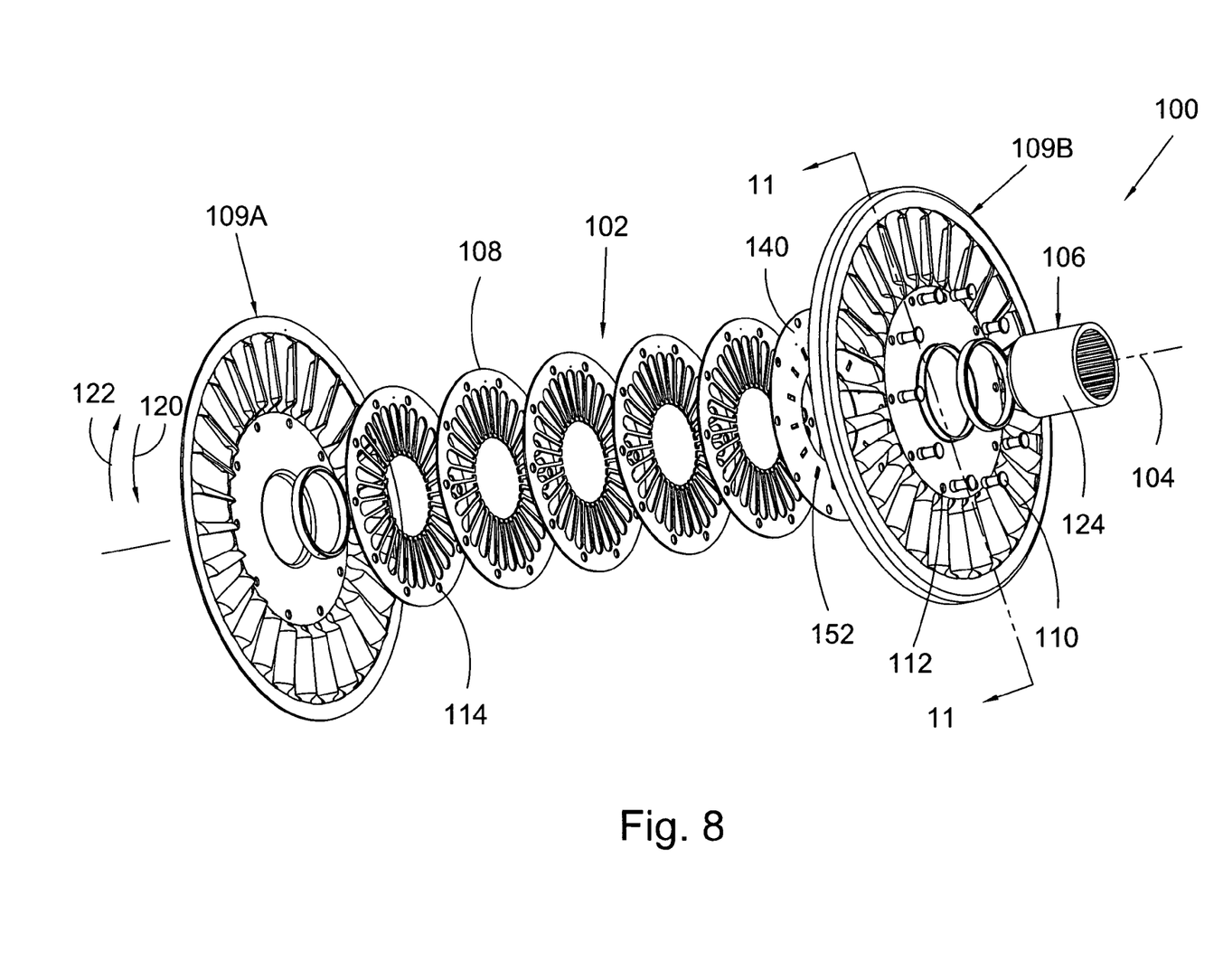
FIG. 8 is an exploded front perspective view of a present invention one-way clutch.

FIG. 8 is an exploded front perspective view of present invention one-way clutch 100.

Figure 9:
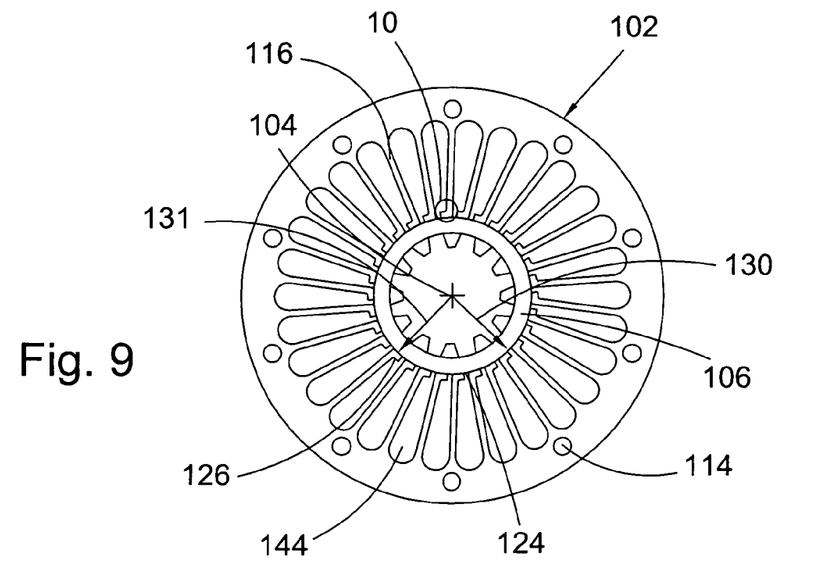
FIG. 9 is a back view of a wedge plate and inner race shown in FIG. 8.

FIG. 9 is a back view of wedge plate 102 and race 106 in FIG. 8.

Figure 10:
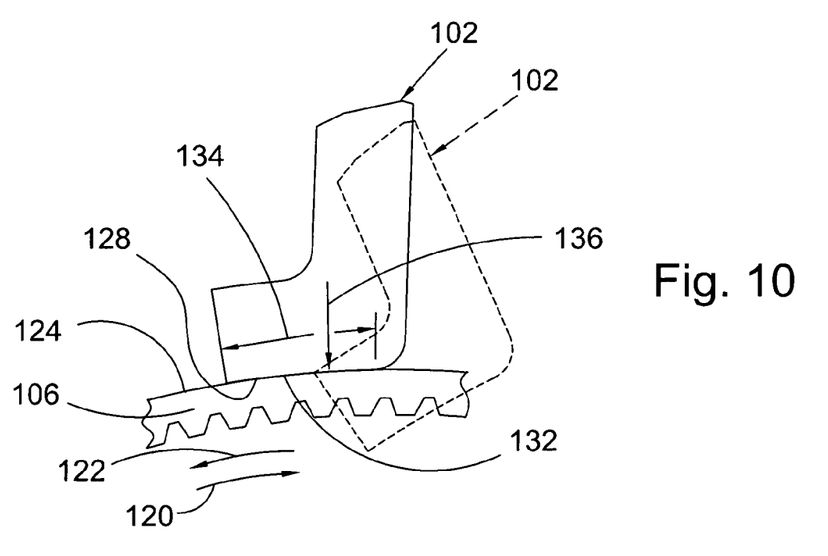
FIG. 10 is a detail of region 10 in FIG. 9 showing the distal end in two positions.

FIG. 10 is a detail of area 10 in FIG. 9 showing distal end 126 in two positions. The following should be viewed in light of FIGS. 8 through 10. One-way clutch 100 includes at least one wedge plate 102 at least partially circumferentially disposed about axis 104 for the clutch, and race 106, also at least partially circumferentially disposed about the axis. One of wedge plate 102 or race 106 is arranged for rotational connection to a torque transmitting element (not shown) in an automotive device (not shown) by any means known in the art. By rotationally connected, or secured, we mean that the plate and the race are connected such that the respective components rotate together, that is, the components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

In some aspects, wedge plate 102 is arranged for connection to the transmitting element. For example, circumference 108 of wedge plate 102 is arranged for connection to the torque transmitting element. In some aspects, the torque transmitting element is a blade assembly for a stator in a torque converter, for example, assembly 109, and plate 102, in particular, circumference 108, is arranged for connection to the blade assembly by any means known in the art, for example, fasteners 110 and openings 112 and 114. Any fasteners known in the art, for example, rivets, can be used. Then, race 106 is a hub and is rotationally fixed to a grounded stator shaft (not shown). However, it should be understood that a present invention clutch is not limited to use with a torque converter stator and that a present convention clutch can be used with other torque transmitting elements in other automotive devices.

For the discussion that follows and for purposes of illustration, wedge plates 102 are connected to the torque transmitting device, unless stated otherwise. However, it should be understood that race 106, rather than wedge plates 102 can be connected to the torque transmitting device and that the discussion infra is generally applicable to the aspects in which race 106 is connected to the torque transmitting element.

Each wedge plate includes a plurality of finger elements, or fingers, 116 extending toward race 106 and in contact with race 106. In FIG. 8, the fingers extend radially inward.

Wedge plates 102 are arranged to rotate independently of race 106 for rotation, with respect to race 106, in rotational direction 120. That is, the wedge plates free wheel for relative rotation in direction 120. This relative motion can be with respect to a rotating race or a rotationally fixed race.

For relative rotation of the wedge plates in direction 122, opposite direction 120, fingers 116 are arranged to grip race 106, in particular, circumferential surface 124, to rotationally lock, or connect, the wedge plates and race 106, as further described infra. In the configuration shown in the figures, the free-wheel direction is direction 120 and the locking direction is direction 122. However, it should be understood that clutch 100 is not limited to this configuration, for example, in some aspects, the free-wheel and locking directions are reversed from those shown in the figures.

Surface 124 is radially opposite the wedge plates and for rotation of the wedge plates in direction 122, the fingers are arranged to exert a radial force against surface 124 to oppose rotation of race 102, also further described infra. In some aspects, surface 124 is a cylindrical surface. In general, the wedge plates and fingers are configured in accordance with the maximum torque expected from the torque transmitting element so that the fingers not only oppose the rotation of the wedge plates, the fingers stop the rotation of the wedge plates in the locking mode direction, for example, direction 122. For relative rotation of the wedge plates in direction 120, the fingers slidingly engage race 106 and surface 124. That is, the fingers slide across the surface without locking with the surface.

It should be understood that clutch 100 is not limited to a rotationally fixed race 106 and rotatable wedge plates. In some aspects, race 106 is arranged for connection to a torque transmitting element and the wedge plates are fixed. In some aspects, both the wedge plates and race are rotatable and the rotation between the torque receiving component(s), which can be either the wedge plates or the races, and the other component(s) is a relative rotation. For example, to trigger the lock up mode, the component(s) connected to the torque transmitting element rotates more rapidly in the lock up direction than the other component(s).

The operation of clutch 100 is now explained in further detail. In general, the change in position of fingers 116 between the free-wheel and locking modes is relatively small. Alternately stated, there is little movement of fingers 116 between the free-wheel and locking modes. Thus, the amount of lash associated with a shift between modes is advantageously reduced.

Fingers 116 include respective distal ends 126 with circumferential edges 128. Edge 128 is in contact with surface 124. Edge 128 is complimentarily shaped with respect to surface 124. By this we mean that edge 128 inversely matches, or mirrors, surface 124. It should be understood that there can be irregularities or discontinuities in a generally smooth, or continuous, surface 124 and that in general, edge 128 at least matches the continuous segment of surface 124. Alternately stated, edge 128 conformably engages surface 124. That is, at least portions of edge 128 are in full contact with surface 124. In some aspects, surface 124 is a cylindrical surface with radius 130, and, edge 128 is a section of a circle with a radius 131 substantially equal to radius 130. That is, the radii are close enough to enable contact between the surface and the edge. Radius 131 can be with respect to axis 104 or with respect to an axis of rotation of the wedge plates, which when plate 102 is installed in clutch 100, is collinear with axis 104. In some aspects, edge 128 is part of circumferential surface 132 of the distal end, surface 132 mirrors surface 124, and surfaces 124 and 132 are respective cylindrical surfaces with substantially the same radius. For the discussion that follows, surfaces 124 and 132 are presumed to be cylindrical, however, it should be understood that other shapes for the surfaces are included in the spirit and scope of the claimed invention.

To accomplish the sliding engagement in direction 120 and the locking engagement in direction 122, fingers 116 are preloaded in direction 122. That is, when the fingers are disengaged from race 106, for example, when race 106 is removed, the fingers move at least partially in direction 122 to assume a rest position. Alternately stated, when the fingers are engaged with race 106, the fingers are forced in direction 120 and apply a pressure to the race at least partially directed in direction 122. To illustrate this point, the approximate position of end 126 when the end is disengaged from race 106 is shown with a dashed line in FIG. 10. It should be understood that the change of position shown by the dashed lines is for purposes of illustration and that other degrees of movement for end 126 between an engaged and a disengaged position are possible. That is, other relative positions are within the spirit and scope of the claimed invention.

In some aspects, when distal end 126 is disengaged from surface 124, edge 128 is offset with respect to the circle described by radius 131. Alternately stated, distal edge 128 is at a nonuniform radial distance from the longitudinal axis for the wedge plate when the wedge plate is disengaged from race 106. That is, the biasing of finger 116 causes end 126 to move from the position shown in FIG. 10 with solid lines, which is defined by radius 131, to the position shown with dashed lines. In the dashed line position, the radial distance between edge 128, or surface 132, and the plate axis varies across circumferential length 134 of the edge or surface. In general, in clutch 100, edges 128 are aligned in respective radial planes with respect to axis 104. Further, the nonuniform radial distance referenced supra presumes that edges 128 are in a radial plane with respect to the longitudinal, or rotational, axis for plate 108. In some aspects, the biasing of the fingers can be implemented by stamping a piece of material to form the general shape of the fingers, flexing the fingers to an offset, or biased, position, stamping the distal ends to form arcuate surfaces 132, and then releasing the fingers.

Due to the preloading noted supra, surfaces 132 are pushed in direction 120 when the fingers are engaged with surface 124 and thus, when the wedge plates turn in direction 120, surfaces 132 slide along surface 124. That is, the sliding motion is a path of least resistance for the surfaces. However, when the wedge plates rotate in direction 122, the bias of fingers 116 causes surface 124 to resist the movement of surfaces 132. That is, the engagement of surfaces 132 and 124 in direction 122 and the resistance of surface 124 causes the generation of radial force 136, which presses surfaces 132 against surface 124. Alternately stated, the fingers "jam" against surface 124 to resist further rotation of wedge 102. In general, increasing the energy applied to rotating the wedge plates in direction 122, increases force 136, further locking fingers 116 and race 106.

For those aspects in which race 106 is connected to the torque transmitting device, the preceding discussion is applicable, with the reversal of directions. Specifically, with the configuration shown, when the race rotates in direction 122 with respect to the wedge plates, the race free wheels, and when the race rotates in direction 120, the race and wedge plates lock.

In some aspects (not shown), the radial configuration of the wedge plates and race is reversed. That is, the race is disposed radially outside the wedge plates and the fingers extend radially outward toward an outer circumference of the plates to engage an inwardly facing circumferential surface on the race. In general, the discussion of the wedge plates and race in the description of FIGS. 8 through 10 is applicable to the preceding configuration with appropriate adjustment of rotational directions. For example, in this configuration, either the wedge plates or race can be connected to the torque transmitting element. In FIG. 8, edge 128 is concave with respect to end 126. In a reverse radial configuration (fingers extending radially outward), the distal edges of the fingers are convex with respect to the body of the finger.

In some aspects (not shown), the configuration of distal end 126 is reversed. That is, instead of extending circumferentially from fingers 116 in direction 122 in FIG. 8, distal ends extend circumferentially from fingers 116 in direction 120. In this case, the free wheel and locking directions are reversed.

Figure 11:
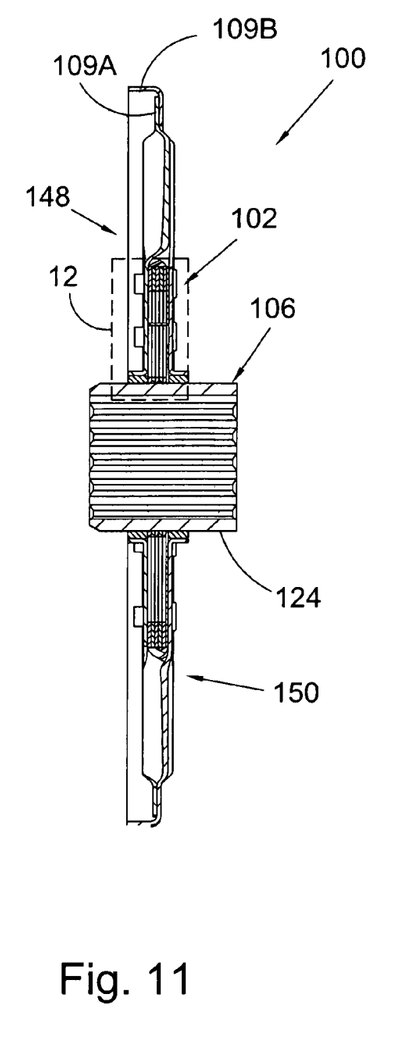
FIG. 11 is a cross-sectional view along line 11-11 in FIG. 8.

FIG. 11 is a cross-sectional view along line 11-11 in FIG. 8.

Figure 12:
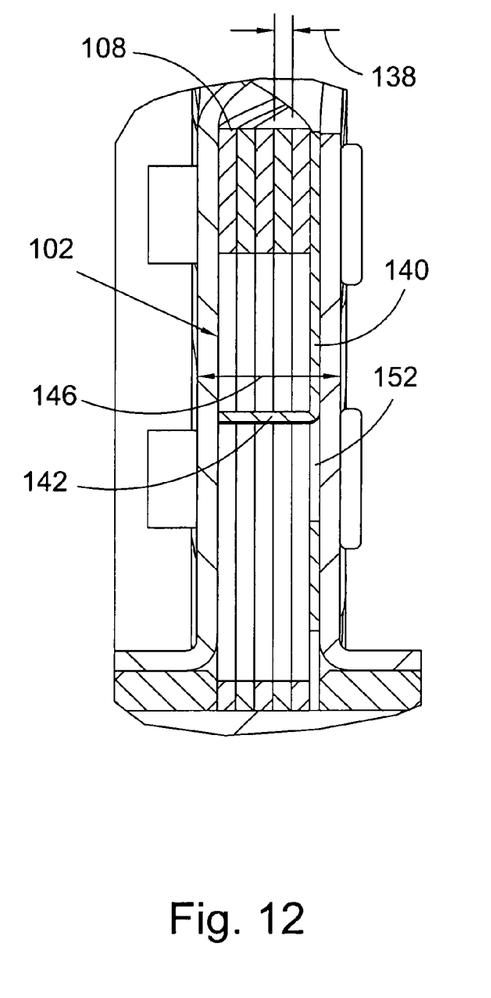
FIG. 12 is a detail of region 12 in FIG. 11.

FIG. 12 is a detail of region 12 in FIG. 11. The following should be viewed in light of FIGS. 8 through 12. Advantageously, during rotational lock up of the plates and race, circumferential dimension 134 of surface 132 of fingers 116 in contact with surface 124 of race 106 is greater than axial dimension 138 of surface 132 in contact with race 106. Alternately stated, the circumferential extent of the finger elements in contact with the race is greater than the axial extent of the fingers in contact with the race. Thus, since the configuration of wedge plates 102 increases the circumferential extent of contact with the races, the axial extent of plates 102 is reduced while maintaining the necessary load-bearing capacity for elements 102. Therefore, the axial extent of clutch 100 is advantageously reduced.

In some aspects, a present invention clutch includes a spacing element. In general, such a clutch includes a race disposed about an axis for the clutch and a clutch element radially disposed about the axis. The clutch element or race is arranged for connection to a torque transmitting element in an automotive device. The clutch element radially operates to rotationally lock with the race. The spacing element is disposed axially through the clutch element to form a mechanical, or solid, path, axially between axial ends of the clutch. By mechanical path, we mean a continuous path of solid material. In some aspects, the spacing element is arranged to transmit a thrust load between the axial ends.

For example, in some aspects, the clutch is clutch 100, the clutch element is plate 102, the race is race 106, and plate 140 includes at least one axial finger, or spacing element, 142. Axial finger 142 is disposed axially through the wedge plate, for example, through openings 144. In general, plate 140 is radially disposed about axis 104. The axial fingers provide a solid axial path 146 from axial end 148 of clutch 100 to the other axial end, end 150, of the clutch. That is, the finger forms at least a portion of the solid, or mechanical, axial path referenced supra. In some aspects, fingers 142 are arranged to transmit a thrust load between axial ends 148 and 150. For example, plates 109A and 109B in conjunction with fingers 142 provide a continuous mechanical path for thrust loads applied to the clutch.

In some aspects, clutch 100 is a stator one-way clutch for a torque converter and thrust loads from bearings (not shown) radially aligned with fingers 142 apply thrust loads to plates 109A and 109B and the loads are transmitted through plate 140 and fingers 142 along path 146.

Thrust loads along path 146 bypass plates 102, preventing axial compression of the plates and enabling proper rotation of the plates. That is, the load is preventing from impinging upon the wedge plates. In some aspects, plate 140 is formed by stamping and fingers 142 are punched from the plate, for example, openings 152 in plate 140 are formed when respective fingers 142 are punched.

Clutch 100 is shown with five wedge plates 102, however, it should be understood that clutch 100 is not limited to a specific number of wedges. For example, clutch 100 can have a single wedge plate or more than five wedges. Advantageously, the number of wedge plates used in clutch 100 can be varied according to the torque expected from the torque transmitting element. For example, increasing the number of plates increases the torque capacity of clutch 100 and vice versa. Thus, the number of wedge plates used can be determined according to the specified torque capacity of the automotive device using the clutch or manufacturing considerations, for example, selecting an optimal thickness of the clutch element with respect to a particular fabricating process. For example, in some aspects, the clutch elements are formed by stamping and the thickness of the clutch elements can be determined to accommodate the stamping equipment used. Specifically, if the clutch is used in a torque converter stator, the number of clutch elements used in the clutch could be increased as the power of the engine for the vehicle housing the torque converter increases and vise versa.

In some aspects, the inner and outer races, the wedge plates, or the space plate are formed by stamping.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A one-way clutch, comprising:
a race disposed about an axis for said clutch; and,
a wedge plate with a plurality of finger elements, wherein:
   each finger from the plurality of fingers includes a respective first portion connected to an outer circumferential portion of the wedge plate and extending radially inward from the outer circumferential portion;
   each finger from the plurality of fingers includes a respective distal end extending radially inward from the respective first portion;
   the respective first portions are aligned with respective radii from the axis;
   said race comprises a circumferential surface radially opposite said wedge plate;
   one of said wedge plate and race is arranged for rotational connection to a torque transmitting element in an automotive device; and
   the respective distal ends include respective circumferential edges complimentarily shaped with respect to said circumferential surface.

2. The one-way clutch of claim 1 wherein said circumferential edge conformably engages said race circumferential surface.

3. The one-way clutch of claim 1 wherein said distal edge is at a nonuniform radial distance from a longitudinal axis for said wedge plate when said wedge plate is disengaged from said second race.

4. The one-way clutch of claim 1 wherein for at least one finger in said plurality of fingers a circumferential dimension of a portion in contact with said race is greater than an axial dimension for said portion.

5. The one-way clutch of claim 1 wherein said one of said wedge plate and race is arranged to rotate independently of an other of said wedge plate and race for rotation, with respect to said other of said wedge plate and race, in a first rotational direction, and wherein said plurality of fingers are arranged to grip said race, to rotationally lock said wedge plate and race, for rotation of said one of said wedge plate and race, with respect to said other of said wedge plate and race, in a second rotational direction, opposite said first rotational direction.

6. The one-way clutch of claim 5 wherein said race or said wedge plate is arranged for connection to said torque transmitting element.

7. The one-way clutch of claim 1 further comprising a spacing element disposed axially through said wedge plate and providing a mechanical path between first and second axial ends for said clutch.

8. The one-way clutch of claim 7 wherein said spacing element comprises a plate radially disposed about said axis and having at least one axially displaced finger, said at least one axially displaced finger comprising at least a portion of said solid axial path.

9. A one-way clutch, comprising:
a race disposed about an axis for said clutch; and,
a wedge plate including a plurality of finger elements extending radially toward said race, wherein said race includes a circumferential surface radially opposite said wedge plate; wherein one of said wedge plate and race is arranged for rotational connection to a torque transmitting element in an automotive device, wherein each said finger element includes a distal end with a circumferential edge complimentarily shaped with respect to said circumferential surface, wherein said circumferential edge conformably engages said race circumferential surface, wherein said distal edge is at a nonuniform radial distance from a longitudinal axis for said wedge plate when said wedge plate is disengaged from said race, wherein when the wedge plate and the race are at rotational rest, the distal edge exerts a radially inward force and a circumferential force on the race, and wherein for at least one finger in said plurality of fingers a circumferential dimension of a portion in contact with said race is greater than an axial dimension for said portion.

10. A one-way clutch, comprising:
a race disposed about an axis for said clutch;
a clutch element radially disposed about said axis; and,
a spacing element disposed axially through said clutch element, wherein one of said clutch element and race is arranged for rotational connection to a torque transmitting element in an automotive device and is arranged to rotate independently of an other of said clutch element and race for rotation, with respect to said other of said clutch element and race, in a first rotational direction, wherein said clutch element is arranged to radially engage said race, to rotationally lock said clutch element and race, for rotation of said one of said clutch element and race, with respect to said other of said clutch element and race, in a second rotational direction, opposite said first rotational direction, wherein a circumferential extent of said clutch element in contact with said race is greater than an axial extent of said clutch element in contact with said race, wherein said spacing element provides a mechanical path axially between first and second axial ends for said clutch, and wherein a portion of the spacing element is radially disposed between an outer circumference of the clutch element and an inner circumference of the clutch element.

11. The one-way clutch of claim 10 wherein said spacing element is arranged to transmit a thrust load between said axial ends.

12. The one-way clutch of claim 10 wherein said spacing element comprises a plate radially disposed about said axis and having at least one axially displaced finger, said at least one axially displaced finger comprising at least a portion of said mechanical path.

13. The one-way clutch of claim 10 wherein said race comprises a circumferential surface radially opposite said clutch element, wherein said clutch element comprises a plurality of finger elements extending toward said race, wherein each said finger element includes a distal end with a circumferential edge complimentarily shaped with respect to said circumferential surface, and wherein said circumferential edge conformably engages said race circumferential surface.

* * * * *